//=====
United States Patent Office 3,444,267
Patented May 13, 1969

---

3,444,267
POLYBLENDS COMPRISING A VINYL CHLORIDE GRAFT COPOLYMER, A STYRENE-ACRYLONITRILE-BUTADIENE GRAFT COPOLYMER AND A VINYL POLYMER
Ludwig A. Beer, Agawam, Mass., assignor to Monsanto Company, St. Louis, Mo., a corporation of Delaware
No Drawing. Filed Aug. 23, 1965, Ser. No. 481,895
Int. Cl. C08f 29/24, 29/22
U.S. Cl. 260—876                                   9 Claims

---

ABSTRACT OF THE DISCLOSURE

There-component blends comprising vinyl halide polymer, vinyl halide graft copolymer, and styrene-acrylonitrile-butadiene graft copolymer. Such blends have improved impact resistance, weatherability and clarity.

---

This invention relates to polyblend resins of the vinyl halide type having improved physical characteristics.

Vinyl halide resins such as vinyl chloride, vinylidene chloride and the like have been found suitable when present in the appropriate proportions for the manufacture of rigid articles such as bottles, sheets, film, pipe, gutter spouts, siding and numerous other structural articles. Specific emphasis for these products is being placed in the field of blown bottleware, and structural products such as house siding, rain gutters and the like.

Polyvinyl chloride homopolymer is generally not acceptable for structural applications mainly due to its low impact strength, but is highly touted for its inertness to the action of other chemicals. In rigid structural materials such as those set forth, good physical properties are critical to the success of the structural articles. Vinyl compounds are especially suited for structural usage because of good weathering properties, but as stated above, polyvinyl chloride, per se is physically deficient due to low impact strength. Numerous attempts have been made to improve the physical characteristics of vinyl halide resin compositions to render them suitable for plastic bottles, films, sheets, and other structurally oriented articles. Substantial emphasis has been placed on the development of a vinyl compound having good impact strength, clarity and weatherability. To date, no solution has been conceived for simultaneously acquiring optimum results for each of these properties, but much has been done to optimize the combination. In other words, where one composition excels in impact strength, its weatherability and/or clarity are deficient.

One development in rigid plastics is physical mixtures of vinyl chloride polymers or copolymers of vinyl chloride monomers and other ethylenically unsaturated monomers with chlorinated olefins such as chlorinated polyethylene. Exemplary of such a mixture is the Frey et al. Patent 3,006,889, which teaches physical mixtures of polyvinyl chloride and copolymers thereof with chlorinated polyethylene within certain proportions. Similarly, the Hankey et al. Patent 3,145,187, teaches the addition of a surfactant to polyvinyl chloride-chlorinated polyethylene physical mixtures in the composition ranges where the chlorinated polyethylene is incompatible with polyvinyl chloride.

Paralleling the physical mixtures of polyvinyl chloride and other components, polymerization of the vinyl chloride monomer or vinyl monomer in the presence of chlorinated polyethylene or other polymers or copolymers have been shown to provide graft polymer compositions having superior physical characteristics to those of the corresponding physical mixtures. In any event, both the physical mixtures and the graft polymers do improve the physical characteristics of the composition over that polyvinyl chloride, per se. Accordingly, these compositions have been deemed somewhat suitable for applications similar to those for which the present invention is directed.

Further attempts have been made to improve the physical characteristics of the resinous compositions by providing physical mixtures of polyvinyl chloride and/or copolymers with various graft polymerization end products. Exemplary achievements are the Hayes Patent 2,802,809, the Heaps et al. Patent 3,167,598 and the Fedderson Patent 2,889,308. Still further, Patent 3,053,800 to Grabowski teaches blends of polyvinyl chloride and acrylonitrile, butadiene, styrene graft copolymers and copolymers of acrylonitrile styrene and alpha methyl styrene.

All of the above patents contain teachings of specific resinous compositions characteristic of having improved physical characteristics over those of polyvinyl chloride, per se, and all of which are somewhat useful in application for the production of structural plastic items. These compositions afford improved impact strength, tensile strength and heat stability to the final product made from the composition. Noteworthy, however, is the fact that while blends of polyvinyl chloride homopolymer or vinyl chloride copolymers with graft copolymers such as polyvinyl chloride-chlorinated polyethylene provide compositions of enhanced impact strength, they are somewhat deficient in light transmittance.

It is therefore an object of this invention to provide a vinyl halide composition that has enhanced impact strength and clarity.

Another object of this invention is to provide a superior vinyl halide composition suitable for blown bottleware.

Still another object of this invention is to provide a vinyl halide composition that is suitable for formation of structural products designed for outside use.

These and other objects will become more apparent from the following detailed discussion of the present invention.

The present invention is yet a further step in the development of rigid vinyl halide compositions having mainly improved impact strength, weatherability and clarity. The resinous compositions of the present invention are suitable for extrusion, calendering, injection molding, blow molding, vacuum forming, or compression molding to produce items such as pipe, gutter spouts, siding, plastic bottles, films, sheets as well as numerous other shaped plastic articles.

The present invention is generally directed to a novel blend of (A) a graft copolymer resin obtained by polymerizing vinyl chloride alone or mixed with a suitable monomer copolymerizable therewith in the presence of an ethylene polymer; (B) a graft copolymer prepared by polymerizing a styrene-acrylonitrile mixture in the presence of a rubbery butadiene polymer; and (C) a vinyl polymer characterized in that the vinyl chloride content is at least 70 percent.

Constituent (A) is a graft copolymer prepared by polymerizing vinyl chloride monomer or a mixture of co-monomers including at least 50 percent vinyl chloride and a monomer copolymerizable therewith in the presence of 4 to 20 percent of an ethylene polymer of the type described below.

Numerous monomers are suitable copolymerizable with vinyl chloride in the preparation of the constituents (A) or (C). While the group from which these monomers is obtained is not so specifically limited, vinyl acetate, vinyl laurate, alkyl acrylates, alkyl methacrylates, alkyl maleates, alkyl fumarates, vinylidene chloride, acrylonitrile, vinyl lauryl ether, vinyl myristyl ether and vinyl cetyl ether are suitable.

The ethylene polymer or backbone polymer, in the preparation of constituent (A) is generally a chlorinated ethylene polymer but is not so limited. Both chlorinated high and low density polyethylenes are suitable. Further, the chlorinated polyethylene may have been homogeneously chlorinated in the dry, dispersed or dissolved state, and additionally may have been chlorinated in the presence or absence of solvents or swelling agents. The chlorination reaction may be activated by heat, light, or free radical initiators. The chlorinated polyethylene may also be crosslinked or uncrosslinked and the compounds preferably contain a chlorine content in the range of 20–45% by weight.

A second suitable ethylene polymer is a copolymer of ethylene and propylene that is chlorinated in the same ways as the polyethylene. The chlorinated copolymer of ethylene and propylene also preferably contains 20–45% by weight of chlorine.

A copolymer of ethylene and vinyl acetate is a further trunk polymer onto which the polyvinyl chloride or copolymers thereof may be grafted. The ethylene/vinyl acetate copolymer may be uncrosslinked or slightly crosslinked and preferably contains vinyl acetate in the range of 30–75% by weight.

A copolymer of ethylene and vinyl chloride is another example of a suitable backbone polymer for the preparation of constituent (A). The ethylene/vinyl chloride copolymers may be uncrosslinked or slightly crosslinked and preferably should contain from about 30–75% by weight of vinyl chloride.

Still further, another example of a suitable ethylene trunk polymer is a copolymer of ethylene and ethyl acrylate preferably having an ethyl acrylate content of 20–65% by weight.

The graft copolymer constituent (B) is prepared by polymerizing 10–200 parts of a mixture of a member of the group styrene and alpha methyl styrene and a member of the group acrylonitrile and alpha methyl acrylonitrile in a ratio of 80:20 to 70:30 in the presence of 100 parts of a rubbery butadiene copolymer. Said rubbery butadiene copolymer may be a homopolymer of butadiene, a copolymer of butadiene and styrene in a ratio of about 70:30 to about 90:10 or a copolymer of butadiene and acrylonitrile in a ratio of about 70:30 to about 95:5.

Constituent (C) may be vinyl chloride homopolymer or a vinyl chloride copolymer of at least 70 percent vinyl chloride and some other monomer copolymerizable therewith. Suitable comonomers include, but are not limited to, vinyl acetate, vinyl laurate, alkyl acrylates, alkyl methacrylates, alkyl maleates, alkyl fumarates, vinylidene chloride, acrylonitrile, vinyl lauryl ether and vinyl myristyl ether.

While very broad ranges of mixtures of constituents (A), (B) and (C) provide improved polyvinyl chloride compositions, the preferred ranges reside in the area wherein the sum of constituent (A) and (C) ranges from about 89 to about 97% by weight of the total compositions and where the sum of constituents (A) and (B) represent from about 50 to about 100% by weight of the total compositions. Furthermore, individual preferred ranges of the various constituents include (A) in the range of from about 40 to about 97%; (B) from about 3 to about 20% and (C) from about 0 to about 57% by weight of the total compositions.

The polyvinyl chloride graft copolymers of constituent (A) may be prepared as described in copending application Ser. No. 204,031, filed June 21, 1962 now U.S. Patent No. 3,268,623. Such process teaches the polymerization of a vinyl chloride monomer in the presence of varying amounts of chlorinated polyethylene preferably in aqueous suspension wherein the reaction was initiated by a peroxidic initiator. Chlorinated polyethylene is substantially dissolved in the vinyl chloride monomer, lauroyl peroxide is added and the polymerization allowed to proceed at temperatures of 25–80° C., and preferably, 45–65° C., until a pressure drop indicates at least 80% monomer conversion.

For a better understanding of the present invention, the following examples and comparative tables are included. These examples are not to be construed as limiting the present invention, but are only evidence of the results obtained by practice of the present invention and are indicative of operating conditions under which the compositions of the present invention are prepared. Unless otherwise indicated, parts are by weight.

EXAMPLE I 100 parts of a polyvinyl chloride graft copolymer resin was obtained by polymerizing vinyl chloride monomer in the presence of 7% chlorinated polyethylene (24% chlorine, intrinsic viscosity of 0.78). The reaction proceeded at 57° C. using a lauroyl peroxide catalyst yielding a resin having a specific viscosity of 0.43 (0.42% in cyclohexanone). Two parts of a tin stabilizer and 0.5 parts of lubricant were then added to the graft resin and the mixture was milled on a two-roll mill at 170° C. After 10 minutes of milling, a ⅛ inch thick sheet was drawn off and test samples were prepared from the milled sheet. A second ⅛ inch thick sample was press-molded at 180° C. for 5 minutes at 2000 p.s.i. A 40 mil thick, press-polished sheet was used for determination of haziness on a GE spectrophotometer by light transmittance at 550 milli-microns wavelength (ASTM D–1003–52).

The aforedescribed samples were analyzed and the data set forth in Table I.

EXAMPLE II

A graft copolymer was prepared by emulsion polymerizing a mixture of 90 parts butadiene-1,3 and 10 parts styrene at 60° C. in the presence of a potassium persulfate initiator and 0.5 percent based on monomer weight of divinyl benzene. After copolymerization, a monomer mixture of 80 parts styrene and 20 parts acrylonitrile were added to the polymerization vessel and polymerization continued at 60° C. until the styrene-acrylonitrile graft polymerized onto the butadiene-styrene substrate. A physical blend was then prepared from 5 parts of the above graft copolymer, 50 parts of the graft copolymer of Example I and 45 parts of a polyvinyl chloride homopolymer suspension resin (specific viscosity= 0.39). This mixture was then blended by milling on a two-roll mill and samples prepared as described in Example I. Analyses of the samples yielded the data as recorded in Table I. This composition is a teaching of the present invention.

EXAMPLE III

A physical mixture was prepared from 90 parts of polyvinyl chloride homopolymer and 10 parts of the graft copolymer composition of Example I. The mixture was milled and samples taken as per the procedure set forth in Example I. Results of analyses of the samples are set forth in Table I.

EXAMPLE IV

A graft copolymer resin was prepared by polymerizing 90 parts vinyl chloride monomer onto 10 parts of a trunk polymer of chlorinated polyethylene (31.6 percent chlorine). The polymerization was carried out at 50° C. in the presence of an acetyl cyclohexane persulfonate catalyst, having a specific viscosity of 0.56. Processing, sampling and analysis procedures set forth in Example I were duplicated. Results of the analyses of Example IV samples appear in Table I.

EXAMPLE V

A physical blend was prepared comprising 50 parts of the graft copolymer of Example IV; 45 parts of a vinyl chloride-vinyl cetyl ether copolymer (96:4) having a specific viscosity of 0.20 and 5 parts a graft copolymer prepared as set forth in Example III and compounding 80 parts of a monomeric mixture of styrene and acrylonitrile (70:30) grafted onto 100 parts of a rubbery copolymer of butadiene and styrene in a ratio of 85:15. This composition was processed as per the procedure of Example I and samples thereby analyzed. Results of these analyses appear in Table I.

EXAMPLE VI

A mechanical blend of 90 parts of polyvinyl chloride homopolymer having a specific viscosity of 0.46 and 10 parts of the styrene-acrylonitrile/butadiene styrene graft copolymer of Example V was prepared. This physical mixture was milled and sampled as described in Example I. Results of analysis of the samples appears in Table I.

EXAMPLE VII

A graft copolymer was prepared by polymerizing 93 parts of vinyl chloride monomer in aqueous suspension in the presence of 7 parts of a slightly crosslinked ethylene-vinyl chloride copolymer (45.4/54.6) and a lauroyl peroxide catalyst. The ethylene-vinyl chloride copolymer contained 31 percent chlorine. Two parts of tin mercaptide, 0.5 part of stearic acid and 2 parts of polymethyl methacrylate were then added to the graft resin and the mixture was compounded on a two-roll mill for 10 minutes at 175° C. A ⅛ inch thick sheet was press-molded at 180° C. for 5 minutes at 2000 p.s.i. A second sample 25 mils thick was press-polished and tested for haziness on a General Electric spectrophotometer by light transmittance at 550 milli-microns wavelength (ASTM D-1003-52). Results of the analyses of the samples appear in Table I.

EXAMPLE VIII

A graft copolymer of 80 parts of a mixture of styrene and acrylonitrile (70:30) was polymerized in aqueous emulsion in the presence of 100 parts of a rubbery copolymer of butadiene and acrylonitrile (93:7). The polymerization reaction was carried out as described in Example III. A mechanical blend was then prepared from 57 parts of the polyvinyl chloride/ethylene-vinyl chloride graft copolymer of Example VII; 40 parts of a polyvinyl chloride homopolymer resin having a specific viscosity of 0.42 and 3 parts of the above described styrene-acrylonitrile/butadiene-acrylonitrile graft copolymer. The mixture was blended on a two-roll mill and sampled as described in Example VII. Results of the analyses appear in Table I. This composition is a teaching of the present invention.

EXAMPLE IX

A physical blend was prepared from 93 parts of a polyvinyl chloride homopolymer resin having a specific viscosity of 0.41 and 7 parts of the styrene-acrylonitrile/butadiene-acrylonitrile graft copolymer of Example VII. This blend was processed and sampled as per the procedures set forth in Example VII. Results of analyses appear in Table I.

ample VI shows superior clarity, but the impact strength for that particular composition is quite deficient. Scanning the entire field of data, therefore, it must be concluded that the compositions of the present invention provide the best combination of good impact strength and good clarity.

Tensile properties were determined at yield for press-molded specimen of Examples I, II and III. This data is recorded in Table II.

TABLE II

| Examples | I | II | III |
|---|---|---|---|
| Tensile stress, p.s.i. (ASTM D-638-60) | 6,420 | 6,170 | 6,830 |
| Percent elongation | 3.7 | 3.45 | 3.68 |
| Modulus, p.s.i.×10$^5$ | 3.4 | 3.3 | 3.4 |

From past experience, it has generally been noted that improvements in impact strength are accompanied by a decrease in the tensile properties of products molded from the particular impact strength improved compositions. Such is not the case with the compositions of the present invention. There is an accompanying decrease in tensile stress at yield as is seen in Example II. This decrease is, however, not nearly so significant as past experience would indicate. Thus, practically the compositions of the present invention have enhanced impact strength without a significant decrease in tensile properties. One may readily ascertain that elongation at yield and tensile modulus are likewise substantially unaffected.

EXAMPLE X

Pelletized compounds were prepared from the composition of Example V. These pellets were fed to a blow molding machine where they passed through a 1½ inch extruder at a stock temperature of 190° C. and were transformed into a tubular parison. This parison material was then subjected to blow molding into 4-ounce Boston-Round bottles. Compounds of Examples IV and VI were also blow molded into Boston-Round bottles and tested for impact strength. The results obtained from the composition of Example V will definitely point out the high impact strength to one skilled in the art. Twenty of these bottles, weighing 15–16 grams and having a wall thickness of about 23 mils were filled with 150 grams of water having a temperature of 25° C. The same procedure was followed with ice water (0° C.). In both cases, bottles dropped from various heights and positions onto a smooth concrete floor withstood repeated drops from a height of 16 feet without breaking. Several bottles withstood drops of even 35 feet without breaking. All the bottles blown from compounds prepared as described in Examples IV and VI broke when dropped from a height of 12 feet at room temperature (25° C.).

It is anticipated that others skilled in the art will find numerous modifications well within the scope of the above description. Hence, the above description should not be limiting, but should only serve as guide lines for

TABLE I

| Example | I | II[1] | III | IV | V[1] | VI | VII | VIII[1] | IX |
|---|---|---|---|---|---|---|---|---|---|
| Izod impact, ft./lb./in.: | | | | | | | | | |
| Milled sheet | 13.8 | 15.4 | 0.9 | 4.3 | 6.5 | 0.9 | | | |
| Molded sheet | 20.1 | 18.0 | 2.4 | 12.8 | 16.0 | 1.4 | 2.6 | 8.6 | 1.7 |
| Percent haze by transmittance at 550 mm. (ASTM D-1003-52) | 26.2 | 7.5 | 3.3 | 9.7 | 5.7 | 4.8 | 7.2 | 4.2 | 3.5 |

[1] Teachings of the present invention.

From the foregoing data, it is evident that the compositions of Examples II, V and VIII are superior to the remaining examples in both impact strength and clarity (percent haze). There are instances where a higher impact strength is attained, i.e. Example I. Note the percent haze, however, for Example I. It is the worst in the group. Likewise, instances occur where clarity is better than that for compositions of the present invention. Exthose skilled in the art and the scope of the present invention should be governed by the appended claims.

What is claimed is:

1. A three-component vinyl halide polyblend composition comprising:
    (a) 40–97% of a graft copolymer prepared by polymerization of a member selected from the group consisting of vinyl chloride monomer and a vinyl chloride monomer mixed with other monomers copolymerizable therewith, in the presence of a member selected from the group consisting of chlorinated polyethylene, chlorinated copolymers of ethylene and propylene, copolymers of ethylene and vinyl chloride, copolymers of ethylene and vinyl acetate, and copolymers of ethylene and ethyl acrylate;

(b) 3–20% by weight of a graft copolymer prepared by polymerization of a mixture of styrene and acrylonitrile in the presence of a rubbery polymer selected from the group consisting of polybutadiene, a butadiene-styrene copolymer and a butadiene-acrylonitrile copolymer; and (c) up to 57% of a polymer selected from the group consisting of homopolymers of polyvinyl chloride and copolymers of vinyl chloride and other monomers copolymerizable therewith.

2. A heat fusible three-component vinyl halide type blend having improved impact strength, weatherability and clarity comprising:

(a) from about 40 to 97 weight percent of a vinyl halide graft copolymer prepared by polymerizing a mixture of:
  (1) compounds selected from the group consisting of vinyl halide monomer and copolymerizable monomer mixtures of at least 50 weight percent vinyl chloride monomer with the balance up to 100 weight percent of such a mixture being other monomers copolymerizable therewith, and
  (2) an ethylene polymer selected from the group consisting of chlorinated polyethylene having a chlorine content of from about 20 to 45 weight percent, chlorinated copolymers of ethylene and propylene having a chlorine content of from about 20 to 45 weight percent, copolymers of ethylene and vinyl acetate containing from about 30 to 75 weight percent vinyl acetate, copolymers of ethylene and vinyl chloride containing from about 30 to 75 weight percent vinyl chloride, and copolymers of ethylene and ethyl acrylate containing from about 20 to 65 weight percent ethyl acrylate,
  (3) said ethylene polymer comprising from about 4 to 20 weight percent of said mixture, (b) from about 3 to 20 weight percent of a styrene-acrylonitrile-butadiene graft copolymer prepared by polymerizing a mixture of:
  (1) a first member of the group consisting of styrene and alpha methyl styrene,
  (2) a second member of the group consisting of acrylonitrile and alpha methyl acrylonitrile, and
  (3) a rubbery butadiene polymer,
  (4) the ratio of said first member to said second member ranging from about 80:20 to 70:30,
  (5) said first and said second member together comprising from about 10 to 200 parts of said mixture for each 100 parts of said butadiene copolymer, (c) up to about 57 weight percent of a vinyl chloride polymer selected from the group consisting of vinyl chloride homopolymers and copolymers prepared from at least 70 weight percent of vinyl chloride monomer with the balance up to 100 weight percent being other monomers copolymerizable therewith, (d) the combined weight of said vinyl halide graft copolymer and said vinyl chloride polymer ranging from about 80 to 97 weight percent of a given blend, and (e) the combined weight of said vinyl halide graft copolymer and said styrene-acrylonitrile-butadiene graft copolymer being at least about 43 weight percent.

3. A blow molded container formed from the blend of claim 2.

4. A blow molded article having a composition as defined in claim 2.

5. An extruding article having a composition as defined in claim 2.

6. An injection molded article having a composition as defined in claim 2.

7. A rigid vinyl chloride polyblend composition comprising an intimately fused blend of:
  (A) 50 parts of a graft copolymer prepared by polymerizing 90 parts of vinyl chloride monomer in the presence of 10 parts chlorinated polyethylene;
  (B) 5 parts of a graft copolymer prepared by polymerizing 50 parts of a styrene-acrylonitrile monomeric mixture in a ratio of about 80 to about 20 in the presence of 100 parts of a rubbery copolymer of butadiene-1,3 and styrene in ratio of about 90 to about 10; and
  (C) 45 parts of polyvinyl chloride homopolymer.

8. A rigid vinyl chloride polyblend composition comprising an intimately fused blend of:
  (A) 50 parts of a graft copolymer prepared by polymerizing 90 parts of vinyl chloride monomer in the presence of 10 parts of chlorinated polyethylene;
  (B) 5 parts of a graft copolymer prepared by polymerizing 80 parts of a mixture of styrene and acrylonitrile in a ratio of about 70 to about 30 in the presence of 100 parts of a rubbery copolymer of butadiene and styrene in a ratio of about 85 to about 15; and
  (C) 45 parts of a copolymer of vinyl chloride and vinyl cetyl ether in a ratio of about 6 to about 4.

9. A rigid vinyl chloride polyblend composition comprising an intimately fused blend of:
  (A) 57 parts of a graft copolymer prepared by polymerizing 93 parts of vinyl chloride monomer in the presence of 7 parts of chlorinated polyethylene;
  (B) 3 parts of a graft copolymer prepared by polymerizing 80 parts of a mixture of styrene and acrylonitrile in a ratio of about 70 to about 30 in the presence of 100 parts of a rubbery copolymer of butadiene and acrylonitrile in a ratio of about 93 to about 7; and
  (C) 40 parts of polyvinyl chloride homopolymer.

References Cited

UNITED STATES PATENTS

| | | | |
|---|---|---|---|
| 3,085,082 | 4/1963 | Baer et al. | 260—876 XR |
| 3,112,290 | 11/1963 | Salyer | 260—878 |
| 3,268,623 | 8/1966 | Beer | 260—876 |
| 3,322,857 | 5/1967 | Coaker et al. | 260—876 |
| 3,322,858 | 5/1967 | Coaker et al. | 260—876 |

FOREIGN PATENTS

| | | |
|---|---|---|
| 626,534 | 8/1961 | Canada. |
| 1,372,908 | 8/1964 | France. |
| 1,381,031 | 10/1964 | France. |

GEORGE F. LESMES, *Primary Examiner.*

U.S. Cl. X.R.

264—98, 331

PO-1050
(5/69)

UNITED STATES PATENT OFFICE
CERTIFICATE OF CORRECTION

Patent No. 3,444,267          Dated May 13, 1969

Inventor(s) LUDWIG A. BEER

It is certified that error appears in the above-identified patent and that said Letters Patent are hereby corrected as shown below:

Claim 8, Part (C), Column 8, line 37 should read
---96 to about 4.---.

SIGNED AND
SEALED

OCT 21 1969

(SEAL)
Attest:

Edward M. Fletcher, Jr.
Attesting Officer

WILLIAM E. SCHUYLER, JR.
Commissioner of Patents